INVENTORS
ROBERT E. PERKINSON
WILBUR H. VON FANGE
MARTIN J. BORROK
FRANK E. CHRISTOFFERSON ns # United States Patent Office 3,341,812
Patented Sept. 12, 1967

3,341,812
AIRBORNE COLLISION AVOIDANCE SYSTEM
Robert E. Perkinson, Wilbur H. Von Fange, Martin J. Borrok, and Frank E. Christofferson, St. Louis County, Mo., assignors to McDonnell Aircraft Corporation, St. Louis County, Mo., a corporation of Maryland
Filed Nov. 9, 1964, Ser. No. 409,697
13 Claims. (Cl. 340—23)

ABSTRACT OF THE DISCLOSURE

A collision avoidance system including a plurality of cooperating airborne components each including time keeping means synchronized so that they keep time in simultaneously occurring time intervals in which each aircraft is assigned a distinct time period within each interval as its assigned message slot, means in each component of the system for transmitting a signal during every occurrence of its assigned message slot, said signals being coded to provide information as to the range and altitude at the transmitting component from which other aircraft receiving said signals can determine the range, range rate, and altitude of other cooperating aircraft within range thereof and can make evaluations based on this information as to whether a threatening condition exists and if so can provide timely warnings to the pilot as to a particular maneuver he should make to avoid collision. The present system may also include means for cautioning a pilot that other aircraft are flying nearby at the same or at different altitudes close enough so that they could become threats, the system may include means for projecting transmitted altitude information to take into account climbing and diving maneuvers, and the system may include means for verifying the validity of each signal it receives to prevent false signals and noise from producing false warnings.

---

The present invention relates generally to airborne communication equipment and the like and more particularly to a collision avoidance system embodying communication principles.

The limited airspace problem around busy airports and in other locations has produced dangerous and unsafe conditions and has resulted in unnecessary accidents and loss of life. Furthermore, the chances for collision have become even more acute with the advent of commercial jet traffic which has moved into the higher altitudes heretofore primarily used only for military purposes. The collision avoidance problem has also been aggravated by the increased speed of airplanes which reduces the amount of time available for making corrective maneuvers. The increased speeds has also meant that pilots must rely more on control and instrumentation aids and less on their own senses to avoid collisions.

These and other conditions led to the development of the subject airborne collision avoidance equipment and system which are extremely accurate and reliable and enable all cooperating aircraft within range of each other to be continuously and repeatedly monitored to provide timely warnings of collision or potential collision threats and also information as to what maneuver to make to avoid a dangerous condition.

The subject collision avoidance system provides pilots with an instrument aid which is fast acting and reliable and takes into account range, range rate, altitude and changes in altitude. The subject system is also capable of simultaneously and continuously cooperating with many other airplanes, and uses all of the above information to assess a threat or potential threat and provides the pilot of each cooperating airplane with information from which he can make the necessary corrective maneuvers to avoid collision.

The present system relies on precise time and frequency synchronization of the equipment in each cooperating airplane, and each airplane is assigned its own distinct predetermined transmission time or message slot which reoccurs during succeeding time periods and is at a different time for each cooperating craft. During its own message slot, each airplane transmits information from which the equipment in the other planes can determine if a potential collision threat exists. If it is determined that a threat does exist the equipment may also include means to indicate to the pilots involved what maneuvers to make to avoid collision. The subject system is capable of performing all of the above and other functions automatically and continuously without operator attention including transmitting, receiving, evaluating information and indicating threat conditions. The subject system is also flexible to admit aircraft entering within the range of the system and to drop those leaving its range, and it is versatile enough to be used to perform functions normally performed by other equipment in the airplane. The addition of the subject system therefore does not normally substantially increase the total equipment or equipment load of an airplane and it may actually reduce the equipment by providing information heretofore provided by other airborne equipment. The subject system also cooperates with other equipment components on the airplane and may expand their usefulness and reliability.

It is therefore a principal object of the present invention to provide airborne means capable of transmitting, receiving and evaluating information from which it can determine collision threat conditions.

Another object is to provide relatively fast acting means for determining when collision threats exist between airplanes.

Another important object is to provide means for warning a pilot of a potential collision threat and at the same time indicate what maneuver to make to avoid collision.

Another object is to provide collision avoidance equipment which are relatively lightweight and compact and do not substantially increase the equipment load of an airplane.

Another object is to provide airborne collision threat indicating equipment which employ one-way transmissions only between cooperating airplanes.

Another object is to provide improved means for identifying airplanes and for determining the relative locations and changes in relative locations of airplanes.

Another object is to provide airborne information received from other airplanes as to range, range rate and altitude to see if a collision threat exists.

Another object is to provide relatively inexpensive collision avoidance equipment which can be subdivided into operating components all of part of which can be employed.

Another object is to provide means for determining threat conditions by comparing actual data and projections thereof with arbitrary standard conditions.

Another object is to provide means for periodically resynchronizing airborne time keeping equipment.

Another object is to minimize the time required to determine if a potential collision threat exists.

Another object is to provide collision avoidance means which operate in real time and do not require complicated computer or storage equipment.

Another object is to provide substantially self-contained collision avoidance means which have minimum reliance on outside equipment.

Another object is to provide airborne collision avoidance means capable of being synchronized to other similar airborne equipment or to a ground station.

Another object is to provide airborne collision avoidance means which cooperate with other airborne equipment and also with ground stations.

Another object is to provide means to warn a pilot that if he makes certain maneuvers he will be in a more dangerous position.

These and other objects and advantages of the present invention will become apparent after considering the following detailed specification which covers preferred embodiments of the subject invention in conjunction with the accompanying drawings, wherein.

Figure 1:
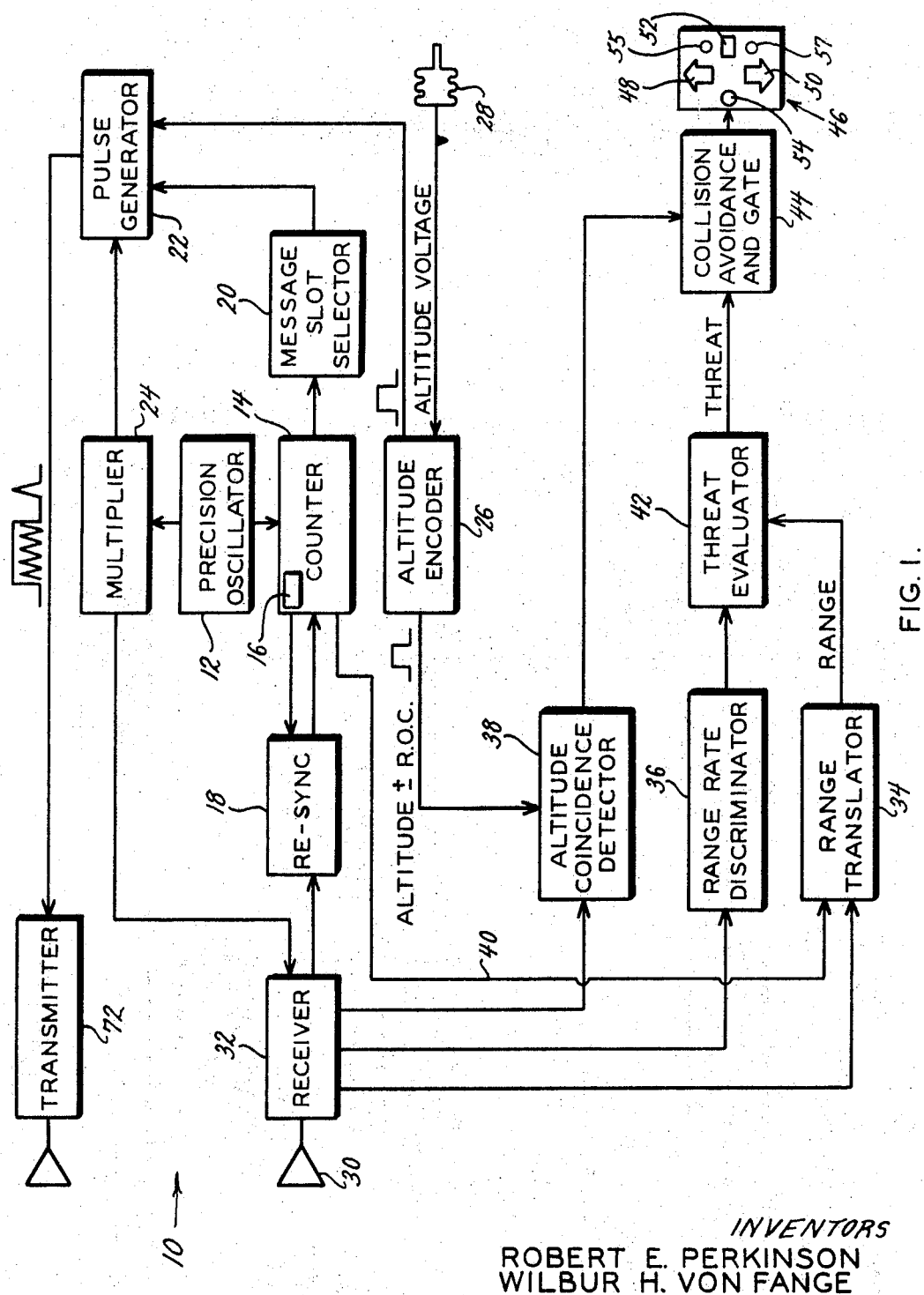
FIG. 1 is a block diagram of a collision avoidance system constructed according to the present invention.

Referring to the drawings more particularly by reference numbers, the number 10 in FIG. 1 refers generally to the circuit for a collision avoidance system constructed according to the present invention. The circuit 10 is constructed to transmit signals containing information as to the identity and location of the airplane. The circuit is also capable of receiving signals containing similar information from all other cooperating airplanes within range thereof. The circuit 10 also includes means for determining from the signals it receives from other airplanes if a collision threat or potential threat exists, and if so, means are provided to indicate this to the pilot along with an indication as to what maneuver, if any, should be made to avoid collision.

Figure 2A:
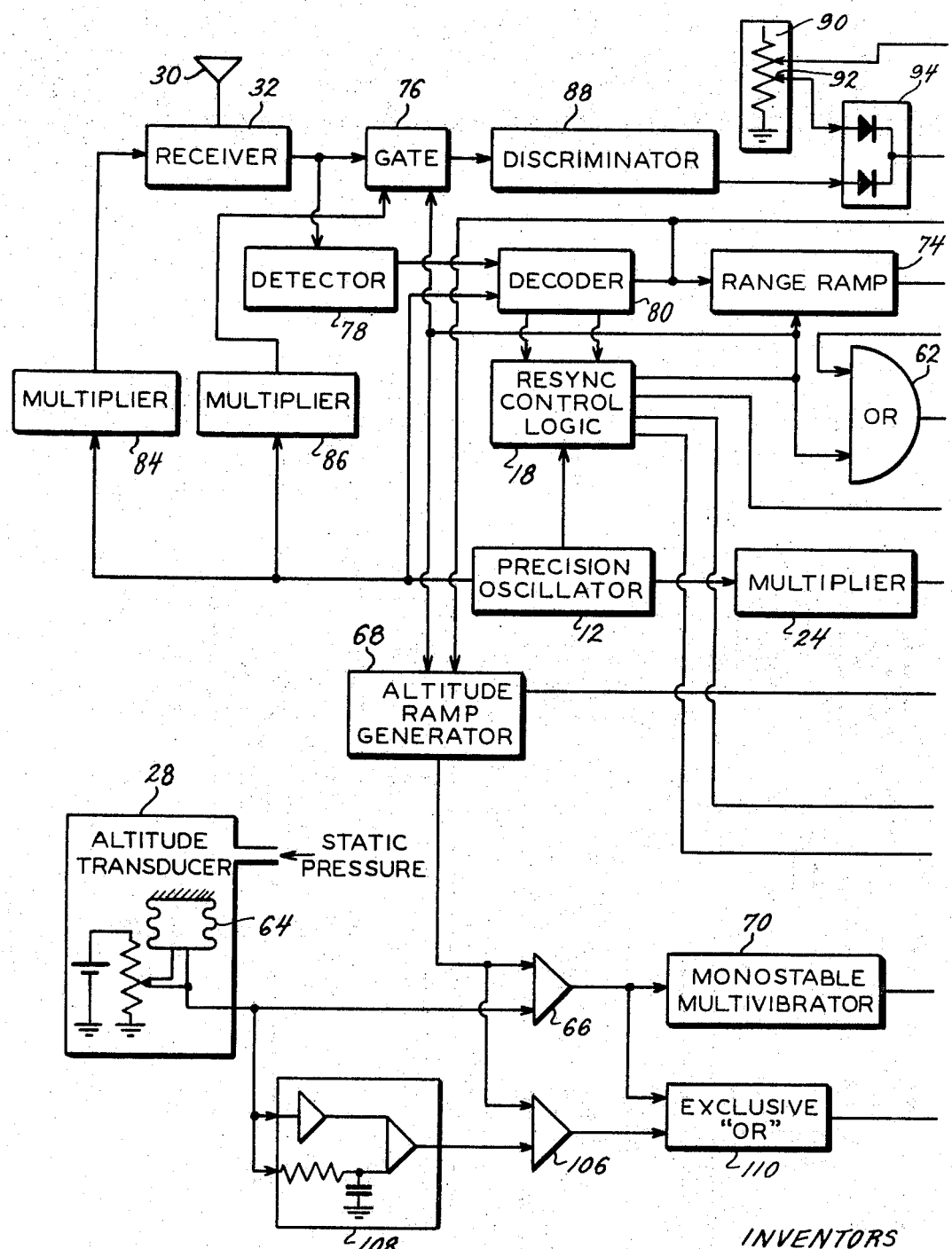
FIGS. 2A and 2B show a more detailed block diagram of the same system.
Figure 2B:
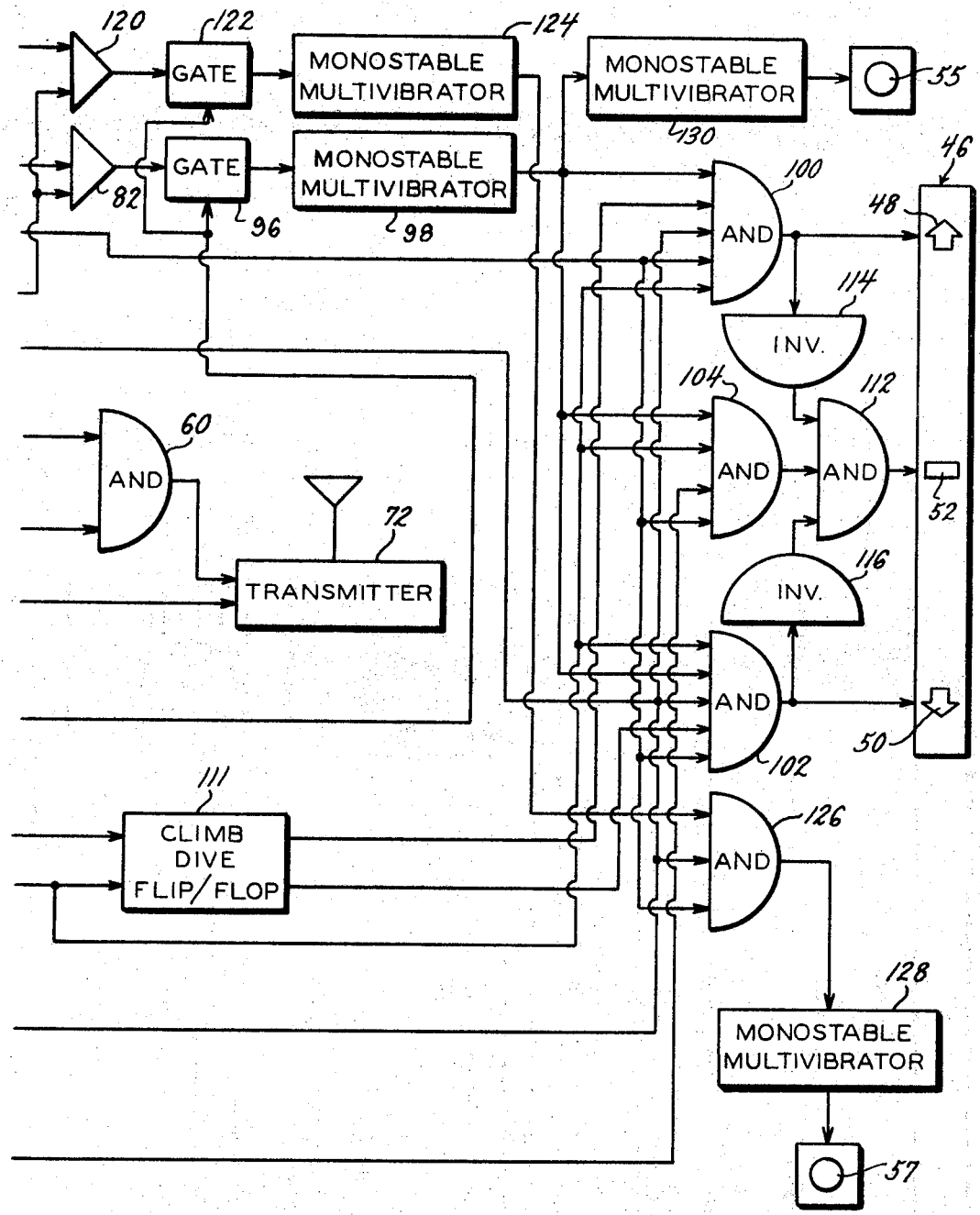

In order for the circuit of the subject system as disclosed in FIGS. 1 and 2 to operate it is essential that it be accurately synchronized with all other similar systems in other airplanes, and it is necessary to maintain this synchronized condition at all times. Means for periodically checking the synchronization of the system in each airplane, and if necessary, resynchronizing the system are disclosed in copending Perkinson et al. application Ser. No. 187,832, now Patent No. 3,250,896, assigned to the same assignee. If the system gets out of synchronization this will adversely effect its operating accuracy and may destroy its effectiveness altogether. While the synchronizing means are important to the subject system they are not part of the present invention as such and it is not deemed necessary to describe them in detail inasmuch as they are disclosed in the above identified copending application.

The subject system is designed to transmit information to and receive information from other cooperating airplanes as to range, range rate, altitude, and to identify each aircraft. The range to each cooperating airplane is determined by the present system in each airplane by direct measurement of the oneway transmission time of an electromagnetic signal from one airplane to another. This is done during each assigned message slot in each time period. The accuracy of the range determination therefore depends on the cooperating systems being accurately synchronized. The range rate or relative movements of airplanes is determined by measuring the Doppler frequency shift in the radio frequency signals as will be described later in connection with FIGS. 3 and 4. The altitude is coded in each transmitted message and each airplane system is provided with means for decoding the received altitude signals and comparing the received altitude information with the present and future altitudes of the receiving airplane. If the receiving airplane is flying in level flight it will not usually be necessary to predict its altitude. On the other hand, if the receiving airplane is in a climbing or diving maneuver then the altitude must be predicted to determine if the receiving airplane will occupy the same altitude as a sending airplane within a predetermined arbitrary time interval. It may also be necessary to predict the altitude information of both sending and receiving craft.

As already stated each cooperating aircraft transmits a message in an assigned message slot of predetermined duration once in every predetermined time interval depending upon the capacity of the system, the amount of information being sent, the system range and the accuracy desired. Furthermore, only one airplane will be assigned to a message slot and this will distinguish its messages from all other aircraft and will also serve to identify each aircraft. Some message slots will usually not be assigned, however, because the system capacity will be greater than the traffic and these can be held in reserve and assigned as needed thereby making the system flexible. The system is also completely flexible allowing a change in an assigned message slot to another plane and the elimination of airplanes that leave the range of the system. The possibility of mutual interference between airplanes is therefore eliminated by the assignment of individual message slots and yet the system adapts itself well to entries of new airplanes and departures. The assignment of message slots is preferably controlled from a central ground station where all system information is coordinated. The functions of the ground station ordinarily do not effect the collision avoidance operations of the present systems as such. The present systems may, however, provide the ground equipment with additional information not heretofore available which will greatly increase its usefulness. The subject collision avoidance system will normally be used with ground or other equipment, and the ground or other equipment may include means for identifying and displaying all cooperating airplanes as to altitude, changes in altitude, positions and relative positions and other information. This information will enable the ground equipment to monitor, coordinate and control the total air traffic within its particular region. The ground equipment may also include accurate time keeping means for synchronizing the airborne systems. The subject airborne system is therefore primarily for preventing collisions between aircraft but is also adaptable for use with ground and other equipment to provide better overall control and monitoring.

Referring to the block diagram in FIG. 1, number 12 identifies a precision oscillator capable of generating a relatively high frequency signal of very precise time accuracy and stability in the order of variation not exceeding approximately a few parts in $(10)^8$. Even with this accuracy, however, the precision oscillator 12 will still be checked regularly and frequently and any errors in its frequency or synchronism will be automatically corrected. Means for doing this, as already noted, are disclosed in copending Perkinson et al. patent application Ser. No. 187,832.

Part of the output of the precision oscillator circuit 12 is fed to a counter circuit 14 which may include a binary counter or similar device 16 which accumulates the pulses sent to it by the precision oscillator 12 during preselected repeating time intervals. The counter circuit 14 is connected to a resynchronizing circuit 18 which includes means for adjusting or shifting the time intervals measured by the counter so that they occur at the exact same times as the corresponding time intervals of a remote master clock or time standard as disclosed in the copending application Ser. No. 187,832. The remote time standard can be located at a ground station, in another aircraft or at some other location. Similar resynchronization means are provided in each collision avoidance system so that all systems will be synchronized together. This is important to the operating accuracy of the systems as already stated. In an actual operating system it has been found that if all aircraft and ground stations are time synchronized to be accurate within about .2 microsecond which is equivalent to a range error of approximately 200 feet the system will operate satisfactory. The precision oscillator 12 should be sufficiently stable so that it will not drift from synchronism by a significant amount during the maximum time intervals between normal resynchronization operations. The oscillator 12 should also be stable enough to operate for extended periods of time without accumulating excessive variation in order for the system to remain reliable even when an airplane is flying over water or over a land area that is not serviced by an accurate time standard. Under these conditions it is also contemplated to synchronize two or more airplanes to each other so that their collision avoidance equipment will operate accurately. It is also possible by using orbiting time standards to maintain accurate time synchronization everywhere.

The counter 14, as stated, includes means for counting oscillator cycles or pulses in repeating time periods. For example, if an oscillator frequency of 5 megacycles is selected for use the counter 14 can be constructed to repeatedly count predetermined groups of oscillator cycles, each group going from 0 to 10,000 cycles. The period required for each such count period is then subdivided into a plurality of individual "message slots." Each cooperating aircraft is assigned a particular one of these "message slots" during which it repeatedly transmits information to all other cooperating aircraft which information serves to identify it and enables the other aircraft to determine its range, range rate and altitude. Usually the transmitted information is in pulse form and is transmitted from each aircraft beginning exactly at the beginning of its assigned "message slot." The duration of each transmitted message is long enough to include all of the necessary information including coded altitude information, and is also long enough to prevent confusion of the message with noise and other disturbances. The duration of each transmitted message, however, is shorter than the full time duration of the assigned "message slot."

The output of the counter 14 is also connected to a message slot selector circuit 20 which recognizes when the counter 14 reaches its particular assigned message slot time. When this occurs, the circuit 20 initiates or triggers a pulse in a pulse generator circuit 22 to start a transmission. The actual pulse emitted by the pulse generator 22 includes a 200 microsecond duration pulse the frequency of which is obtained by multiplying the frequency of the 5 megacycle precision oscillator 12 by a particular multipler to produce the desired carrier frequency for transmission. The means for multiplying the 5 megacycle oscillator output to obtain the carrier frequency is the frequency multiplier circuit 24 which may include a non-linear device such as a varactor diode. The non-linear characteristics of the varactor are used to produce power at harmonic frequencies, one of which is selected for filtering and amplification. If desired, a chain of similar non-linear devices can be connected in cascade in order to produce even higher order frequency multiplication. If desired, frequency mixing and multiplying devices can also be used.

The altitude of the airplane is coded for transmission immediately following the transmitted 200 microsecond range signal under control of an altitude encoder circuit 26. The output of the altitude encoder circuit 26 is connected to the pulse generator circuit 22 for coding the transmitted output signal proportional to altitude. The altitude encoder circuit 26 is in turn controlled by altitude responsive means 28 which are included in the airplane. For example, the airplane may include an altitude measuring device capable of producing an output voltage proportional to altitude. Such a device may be a variable potentiometer connected in a voltage circuit and controlled by a pressure expansion device. The altitude information thus obtained can then be connected using analog to digital conversion means to produce an output pulse for transmission. The coded altitude information may be in the form of a transmitted pulse which occurs at some predetermined time after the end of the 200 microsecond range pulse. The time duration between the end of the 200 microsecond pulse and the occurrence of the altitude pulse will then be proportional to the altitude of the airplane. For example, if the airplane is flying at sea level the altitude pulse will occur closely after the end of the 200 microsecond pulse or at about 210 microseconds after the beginning of the message slot. For an airplane flying at 60,000 feet the altitude pulse will occur much later or at about 510 microseconds after the beginning of the assigned message slot (or about 310 microseconds after the end of the 200 microsecond pulse). For airplanes flying at altitudes between these altitudes the occurence of the altitude pulse will vary linearly therebetween. Each airplane system also includes means for interpreting the received altitude information and for comparing this information with its own altitude.

The altitude encoder 26 is preferably also constructed to simultaneously accept as an input another analog voltage representing a 60 second prediction of altitude based on whether the plane is climbing or diving. The output from the altitude encoder resulting from this input is a pulse which spans a predetermined time interval from the time representing the present altitude to the time representing the predicted altitude. This is accomplished in every message slot. In each received message slot the altitude encoder is initiated upon receipt of a verified signal from another aircraft. In ones own message slot, however, the altitude encoder is automatically initiated at the start of the assigned message slot. A ramp voltage is generated by a binary counter chain which is started at the desired time and performs a digital-to-analog conversion using a ladder resistor network which continuously sums the state of the binary outputs. The ramp voltage thus produced is fed to two voltage comparator circuits one of which compares the ramp voltage with the analog voltage representing the present altitude of the subject airplane, and the other comparator circuits therefore produce voltage level changes at times representing present and predicted altitude. The voltage level changes are presented to an "exclusive or" gate and the resultant output is a pulse in the time domain over the time interval representing present to predicted altitude. The widened pulse is used for altitude threat evaluation in the altitude coincidence detector circuit 38. The voltage level change which represents present altitude is then used to trigger a monostable multivibrator (one-shot) circuit of conventional design for purposes of transmitting altitude information in ones own message slot. All of the individual components of the altitude encoder 26 can be of conventional construction and therefore need not be described in detail.

The pulses transmitted by each airplane are received in all other cooperating airplanes at antenna 30 which is connected to receiver circuit 32. The output of the receiver 32 is connected to a number of different circuits in the system including the resynchronizing circuit 18 described above. The receiver is also connected to a range translator circuit 34, a range rate discriminator circuit 36, and the altitude coincidenuce detector circuit 38.

The range translator circuit 34 may be either a digital or analog time accumulator circuit and is used to measure the range or distance to each transmitting aircraft. The range in each case is determined directly using the time of receipt of each signal because of the fact that all systems are synchronized. The range translator circuit 34 is started by pulses it receives from the counter circuit 14 over lead 40. The pulses occur at exactly the times that signal transmissions are started in other cooperating airplanes. The difference between the time of receipt of signals from other aircraft is therefore a direct measure of the range therebetween. The range translator circuit measures these time differences in each message slot and the leading edge of each received signal is used to stop the accumulation of time so that the range reading will be retained until the end of the message slot. The count that has been accumulated or the voltage that is clamped in the range translator circuit 34 represents the oneway transmission of time of a signal sent from one airplane to another. It should be borne in mind that this operation occurs during each message slot that is used so that there is a direct range reading to all cooperating airplanes within range during each operating cycle. It should also be noted that the range readings as well as the other readings are made in real time and do not require storage beyond the end of each message slot, and therefore the present system does not require a stored program computer. In a particular implementation of the subject device, voltage ramp techniques are employed and the range measurement is represented as a voltage proportional to range. Counter means using a ramp type counter can also be used.

It is a unique feature of the subject system that all cooperating aircraft are capable of repeatedly measuring range to every other cooperating aircraft by receiving a pulse transmitted from each aircraft during each occurrence of its assigned message slot. This is possible as already stated because of the precise time synchronization which is established and maintained for all cooperating aircraft. This eliminates the need for continuously interrogating other aircraft and eliminates the need for radar equipment which requires sending out and receiving back signals. The present system is therefore faster acting and more reliable than radar and interrogation techniques because it requires only one-way transmissions and depends on positively transmitted signals which are easier to receive and to distinguish from noise and other disturbances.

The range rate discriminator circuit 36 includes means for producing a change in voltage proportional to a shift in frequency. To accomplish this the discriminator circuit 36 receives an input signal corresponding to ones own multiplied output carrier frequency signal. This input is used to establish a zero reference or a zero relative velocity signal. At the beginning of each message slot the discriminator circuit 36 is switched to a condition which allows it to sense the frequency of the received signals. Any shift in frequency between the incoming signal and the zero reference frequency is caused by relative motion between the transmitting and receiving aircraft. These shifts can be calibrated directly to provide readings of the relative velocity or range rate between the two aircraft. This can be accomplished because of the frequency coherence established by the accurate crystal oscillators or similar synchronized time standards 12. The accuracy of the range rate readings produced by the subject system is primarily a function of the time available for making the range rate measurement and the signal to noise ratio. For a transmitting carrier frequency of approximately 1,545 megacycles and a 200 microsecond range pulse in each message slot, it has been found that range rate can be read to a resolution accuracy of approximately ±30 knots. Even greater accuracy can be obtained by increasing the duration of the transmitted range pulses. This method of measuring range rate has the advantage of requiring less time than known methods which require frequency mixing and then developing a signal proportional to the frequency difference or shift.

It is particularly important to the present invention to provide means to evaluate potential threat conditions and to warn the pilot when a threat exists. It even is also desirable to be able to indicate to the pilot what maneuver is necessary to avoid collision. For the pilot to gain confidence in the system, it is also very important to keep false alarms to a minimum and not to waste the pilot's time and effort unnecessarily. This is accomplished in the present system by establishing certain arbitrary minimum conditions or potential threat criteria and to base potential threat warnings on as much pertinent information as possible including range, range rate and altitude information. Time to collision is also accounted for in setting the arbitrary criteria.

The time to collision measurement involves the solution of a division problem in which range (R) is divided by range rate ($\dot{R}$). This can be expressed by the equation $t=R/\dot{R}$. In the present system it has been found more desirable and simpler not to perform the indicated division problem as set forth in the equation but rather to solve electrically the equation $R-\dot{R}t=0$. In this equation $\dot{R}$ represents range rate in knots or any other suitable measure, $t$ is the selected warning time or time to collision and R represents range in miles or any other suitable measure. The warning time $t$ can be selected to produce a collision threat warning within any desired time such as within a minute or a minute and a half away and so on.

Establishing a minimum range condition is a necessary part of the solution to the above equation even if the airplanes involved are not rapidly closing on one another. This is because it is usually desirable to let the pilot know when another airplane is close even though not closing on him because of the possibility of a change in heading or speed which could result in a collision before an effective avoidance action can be taken. Therefore, when the above equation is satisfied the aircrafts are on the warning line and the pilots are so advised. If the above equation is not satisfied, the polarity of the result will still be of use to indicate whether there is or is not a threatening condition. A typical circuit that can be used for solving the above equation includes a differential amplifier which performs the equation summing function and one or more gain potentiometers used to adjust for the arbitrary conditions. The output of the circuit will then be a positive voltage when an observed airplane is not a time or range threat and a negative voltage when an observed airplane is within the predetermined conditions such as within one and one-half miles or 60 seconds to apparent collision or both. A change in polarity between a potential threat and a nonpotential threat condition controls whether a signal will be fed from a threat evaluation circuit 42 to a threat gate circuit 44 which may be an "and" gate. The output of the "and" gate 44 is connected to a threat indicator light located in the cockpit or optionally to a cockpit display device 46 which includes a plurality of lights which are energized selectively to indicate to the pilot what maneuver to make to avoid collision when a threat exists. The gate 44 also receives a second input from the output of the altitude coincidence detector circuit 38.

The range and range rate threat signals described above represents one part of the total information required for the system to indicate a threat condition. The other part of the total information required for a potential threat as indicated is the altitude information which involves a comparisons of the altitudes of the airplanes involved. For example, if two airplanes are operating at entirely different altitudes then even though the range and range rate information are such as to indicate a potential threat no potential threat will be indicated because only one instead of two needed conditions are met. This is controlled by the gate 44. On the other hand, if two airplanes representing a range or range rate threat have the same altitudes or are expected to have the same altitudes within a predicted time period then an actual potential threat exists and one or both pilots will be so advised. The altitude coincidence detector 38 described above resolves the question of whether the airplanes present an altitude threat.

In order to evaluate a threat arising from a climbing or diving aircraft which is not now at the same altitude as the other airplane but which may pass through the same altitude, the altitude encoder circuit 26 is provided with means to spread the altitude pulse of the climbing or diving craft in the direction in which it is moving. This can be accomplished in many different ways using mechanical as well as electrical devices. For example, as already mentioned altitude can be represented as a voltage proportional thereto and this voltage can be used to spread the altitude pulse in the direction in which the altitude is changing. Transmitting altitude information including spread pulses to indicate a climbing or diving maneuver will also be of interest to a ground station monitoring a given area.

The cockpit display device 46, as noted, is an optional feature to provide specific information as to what maneuver to make to avoid a threatening collision. The operation of the display will be described more in detail in connection with the circuit of FIG. 2. The display 46 includes an "up" arrow 48 which is illuminated to indicate to the pilot that he should climb to avoid collision, a "down" arrow 50 to indicate he should descend, and a level off bar 52 to indicate to the pilot of a climbing or diving plane that he should level off. Items 48, 50 and 52 are illuminated individually when the necessary conditions exist. The panel display 46 may also include another light 54 which should remain on at all times if the system is being synchronized. This can only occur if the plane is within range of a synchronizing station. If it is not within range of a synchronizing station it should not, and cannot be synchronized.

The controls for the display means 46 should preferably also include means to indicate opposite maneuvers to two airplanes flying at the same altitude. This can be controlled arbitrarily by instructing the airplane with the earlier message slot to go up and the other airplane to go down or vice versa. The circuitry required for this can include simple gate control circuits. This arrangement allows a completely unambiguous avoidance maneuver for all threatening conditions.

When a threat is indicated between a climbing or diving aircraft, as already noted, the level off bar 52 will be energized to tell the climbing or diving pilot to level off because of the presence of a collision threat from an airplane flying at an altitude through which the climbing or diving aircraft will pass within the arbitrary time period. In this case, the collision threat will be displayed in only one aircraft and the level flying airplane will not ordinarily receive any collision warning.

Various additional features are also possible and can be incorporated into the subject collision avoidance system. For example, a circuit can be included which allows the collision warning indications to be suppressed between aircraft which are flying in close proximity such as in formation flights. In this situation, blocks of adjacent message slots may be assigned to the formation aircraft and inhibitation circuits can be included which allow them to ignore only those airplanes which are in the same "pack" or block of message slots. These circuits will, however, allow the pack planes to be warned against all other aircraft.

Figure 6:
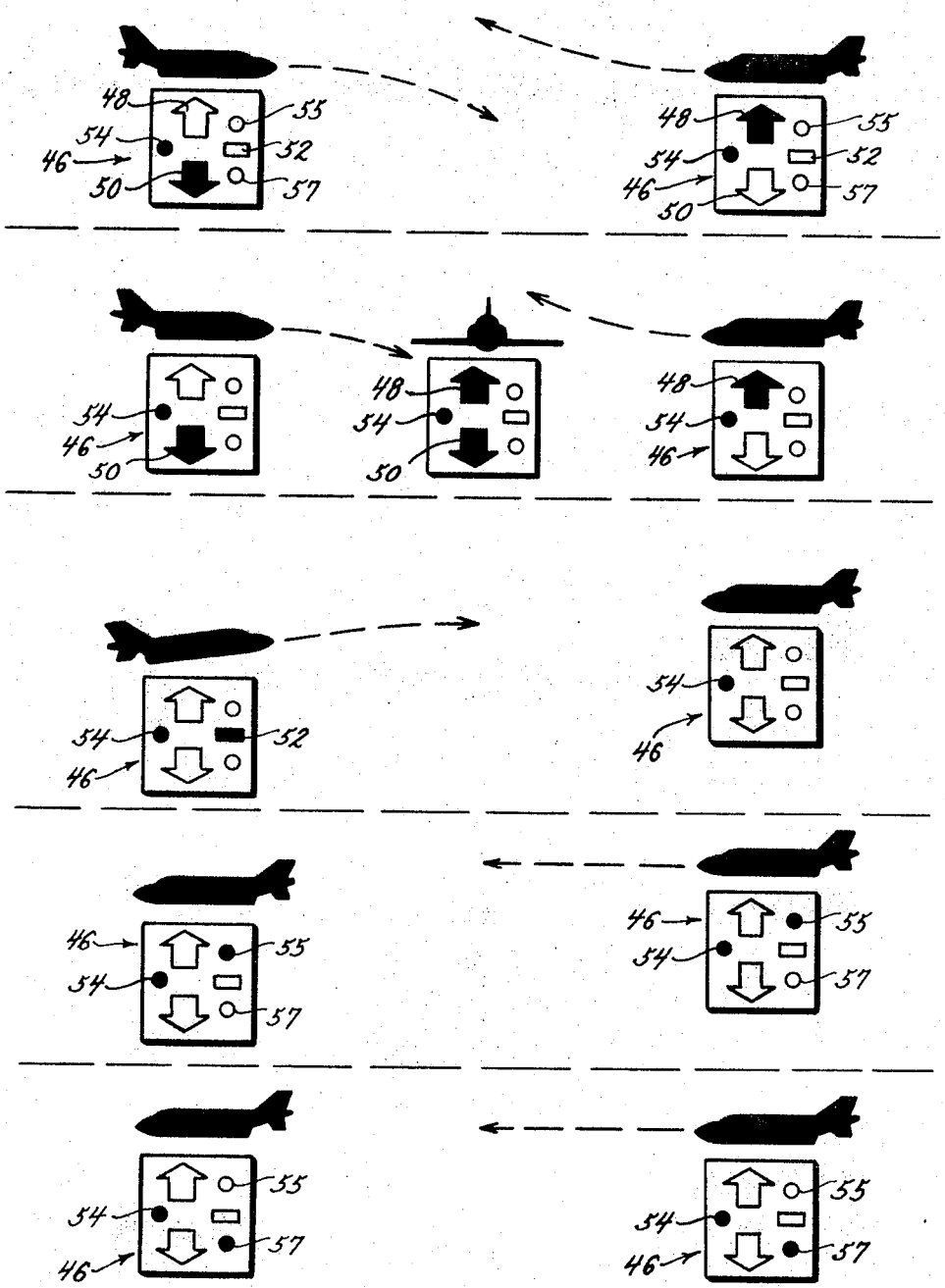
FIG. 6 illustrates the warnings available for presentation to a pilot under different conditions of potential collision threat.

The panel indicator means may also include other lights including the two lights 55 and 57 (FIGS. 2 and 6). The light 55 is energized to warn a pilot not to climb or dive because of another airplane flying at a higher or lower altitude and within a predetermined range. The light 57 is energized to indicate there is another airplane nearby flying at the same altitude but going in a direction which does not represent a present threat. The information provided by the lights 55 and 57 will be very helpful particularly to pilots flying in crowded traffic conditions such as in the vicinity of an airport. The circuit details controlling the lights on the cockpit indicator 46 will be described later in connection with FIG. 2. The controls for the modified lights can use the same or similar outputs presently available but slightly modified to remove the co-altitude inhibition and to remove the range inhibition from the co-altitude threats. The circuit for this may be constructed along the lines shown in FIG. 2.

It is also possible to assign test message slots in which warnings can be inhibited even in normally operating aircraft so that false alarms are not generated and yet tests can be conducted to assure that the systems are operating properly. The system may also include a counter to allow the decoding of incoming signals to determine whether the signals are (1) normal transmissions from other aircraft, (2) resynchronization transmissions from a ground station, or (3) message slot zero signals from a ground station. The details of the last circuit are covered in co-pending application Serial No. 187,832.

FIG. 2 is a more detailed block diagram of an actual circuit for the subject system. The components in the diagram of FIG. 2 which correspond to similar components in FIG. 1 are similarly identified. When an airplane equipped with the circuit of FIG. 2 is transmitting during its assigned message times or slots, it transmits first a 200 microsecond duration range signal as explained above. This is accomplished by the modulation "and" gate 60 which is controlled or enabled by the occurrence of an output from "or" gate 62 at the beginning of its own message slot. In addition to the 200 microsecond range signal, the altitude is also coded for transmission as aforesaid. The time of transmission of the altitude pulse is controlled by the altitude transducer 28 as aforesaid which may include a pressure sensitive element such as the element 64 which is capable of producing a voltage output that varies with pressure. The altitude voltage thus produced is used as one input to a differential amplifier circuit 66 which receives a second input from the altitude ramp generator circuit 68. The ramp generator 68 may be a binary counter which is started when it receives a verified video input signal. The generator 68 is therefore triggered at the leading edge of each arriving signal and counts up during and after the range pulse and if the signal persists for a predetermined time period it is assumed to be a valid signal. Other means for verifying an input signal can also be used. After the conclusion of the range pulse an analog voltage is generated by a digital-to-analog conversion operation using a ladder type resistor network which continuously sums the states of the binary counter. This results in a staircase range voltage which steps up by a predetermined amount every microsecond. For example, in an actual device the staircase voltage is stepped up 1/50 of a volt every microsecond and each such step is equivalent to 200 feet of altitude. This means that if two (2) volts represent zero feet of altitude, eight volts will represent an altitude of 60,000 feet.

The differential amplifier 66 compares the present altitude voltage of the receiving airplane with the voltage generated by the ramp generator as aforesaid and when the ramp voltage exceeds the altitude voltage the differential amplifier 66 will produce an output which turns on monostable multivibrator circuit 70. The output of the circuit 70 is fed as one input to the "or" gate 62 described above. This means that when an airplane is operating in its own message slot an output will be provided from the "or" gate 62 to one input of the "and" gate 60 to produce a pulse to modulate the transmitter 72 to transmit an altitude pulse at the proper time.

In every message slot the resynchronizing circuit 18 will also generate a range pulse starting exactly at the beginning of the message slots. These pulses start a range ramp circuit 74 and reset the altitude ramp 68 to zero. The zero range pulses are also used to switch gate circuit 76 from a condition allowing passage of a reference intermediate frequency signal obtained by multiplying up from the basic 5 megacycle precise oscillator 12 in multiplier 86. The system is now ready to receive signals transmitted by other airplanes. Each time a signal is received at the receiver 32 it is heterodyned and the resulting intermediate frequency signal is detected by detector circuit 78. These signals are tested by a decoder circuit 80 which may be in the form of a delay line or a combination of a flip-flop counting chain and recognition gates. The decoder 80 tests the incoming signals as aforesaid to determine if they are (1) warning transmissions from other aircraft, (2) resynchronizing signals from a ground station or other time standard, or (3) message slot 000 start signals which occur at the beginning of each sequence of message slots. Whenever the decoder 80 receives a signal from another aircraft and verifies that it is a warning signal, it produces an output which is used to stop the range ramp circuit 74 which was started earlier at the beginning of the message slot. The same signal also starts the altitude ramp circuit 68. The range ramp circuit 74 then generates a linearly increasing voltage which starts exactly at the beginning of each message slot and is stopped upon the receipt of a verified video signal. The output of the range ramp circuit 74 is a voltage equal to the voltage that has been stopped in it and represents the true range between the transmitting and the receiving aircraft. This voltage is applied to one of the inputs of a differential amplifier circuit 82. The other input to the differential amplifier circuit 82 will be described later.

The receiver 32 is preferably also coherent with the 5 megacycle oscillator frequency and is controlled by multiplier circuit 84 which is connected in the line thereto from the oscillator 12. The multiplied oscillator signal is mixed in the receiver 32 with the incoming signals to generate intermediate frequency (IF) outputs of the same frequency as the frequencies obtained by multiplying the oscillator frequency in multiplier circuit 86 plus or minus any Doppler frequency shift in the received signals. The output of the multiplier 86 is fed as a second input to the gate 76. Whenever a frequency shift caused by relative motion between a transmitting and receiving aircraft occurs it will be reflected as the frequency difference between the two inputs to the gate 76. It is important to the accuracy of this frequency difference that the precision oscillators 12 in all cooperating aircraft be highly accurate and be synchronized.

The intermediate frequency (IF) inputs to the gate circuit 76 are then alternately fed to a discriminator circuit 88 which may have any one of a number of different constructions capable of measuring frequency and providing outputs proportional to the frequency of the inputs. Frequency modulated discriminator circuits and crystal discriminator circuits can be used for this purpose. The gate circuit 76 is therefore used to alternately allow the discriminator circuit 88 to read the reference intermediate frequency and the received intermediate frequency so that the difference in the locally generated IF and the received IF signals can be determined. The outputs of the discriminator circuit 88 are voltages proportional to the relative velocity or range rate between two aircraft and can be projected to cover any predetermined time interval as aforesaid. In this particular system, a voltage is produced which is proportional to the range decrease which would result if the relative velocity were maintained for 60 seconds. This shall be referred to hereinafter as the one minute range.

A minimum range control circuit 90 is also provided and includes an adjustable voltage source controlled by a potentiometer 92. The potentiometer can be adjusted to provide any desired minimum warning range for the subject system. The outputs of the discriminator 88 and of the minimum range circuit 90 are fed on separate inputs to an "up-follower" circuit 94 which includes two diodes. The output of the "up-follower" circuit 94 will be either the minimum warning range voltage or the one minute range voltage, whichever is higher. The output from the "up-follower" circuit 94 is fed as a second input to the differential amplifier circuit 82 wherein it is compared to the output from the range ramp circuit 74 as discussed above. Whenever the true range voltage fed to the differential amplifier 82 is less than the safe range input, a warning output will be fed from the differential amplifier 82 to "and" gate 96. These signals will pass through the "and" gate 96 whenever a read pulse is generated by the altitude ramp circuit 68. A read pulse is generated just before the end of every 200 microsecond range pulse as aforesaid. If a threat signal is allowed to pass through the "and" gate 96 it will trigger a monostable mutlivibrator circuit 98 which will apply a range threat pulse to each of three output "and" gates 100, 102, and 104.

Recalling that the altitude ramp 68 was started by a verified signal at the beginning of the warning pulse, and that it generated an altitude pulse positioned to correspond in time to the altitude of the airplane, it should be noted that the altitude ramp 68 provides another output to another differential amplifier 106. This signal is compared to the output of an altitude transducer circuit 28 after it has passed through an altitude predicting circuit 108. The circuit 108 differentiates the altitude output from the altitude transducer circuit 28 and produces an output that is equal to the sum of the present altitude plus or minus the rate of change of altitude over a predetermined time interval such as 60 seconds. This predicted altitude voltage is compared with the output of the altitude ramp circuit 68 in the circuit 106 and the circuit 106 produces an output whenever the altitude ramp voltage exceeds the predicted altitude voltage.

The output of the differential amplifier 66 is used to trigger the monostable multivibrator circuit 70 which presents an altitude warning threat to the output "and" gates 100 and 102. The circuit 66 also provides an input signal to an exclusive "or" gate 110. Therefore, the present altitude and the predicted altitude voltages are both presented through the differential amplifiers 66 and 106 to the exclusive "or" gate 110 and if either voltage is present but not both at the same time, an altitude band threat output will be produced at the output of the gate 110. This output will also be presented as an input to the output "and" gate 104.

The output "and" gate 100 is the climb control and is used to energize the "up" arrow 48 in the cockpit display 46. The output "and" gate 102 is the dive control and is used to energize the "down" arrow 50 in the cockpit display 46, and the output "and" gate 104 is the level off control and is used to energize the "level-off" light 52. The gates 100 and 102 therefore produce warnings whenever a range threat and a co-altitude threat are simultaneously present. The subject circuit may also include means to prevent false warnings during the message slot assigned to the receiving airplane. This is done by providing inhibit signals which are applied from the resynchronizing circuit 18 to prevent an output from the output gates 100, 102 and 104 whenever the airplane is in its own assigned message slot.

If two airplanes are flying at the same altitude when they present a threat to one another some arbitrary means must be provided to tell one of the airplanes to climb and the other airplane to dive. This can be done on the basis of when their message slots occur. A climb-dive flip-flop 111 can be provided for this purpose.

The output "and" gate 104 is provided to take care of situations where one airplane is climbing or diving at a rate such that it would be expected to be a threat within the arbitrary assigned time to collision such as 60 seconds. In this case the output from the exclusive "or" gate 110 is combined with the range warning signal in the output gate 104 to energize the level off control 52. Level off signals are prevented from occurring, however, when airplanes are flying at the same altitude by means of inhibiting gate circuit 112 which is controlled by inverter circuits 114 and 116 connected respectively to the outputs of "and" gates 100 and 102.

The arbitrary range and altitude boundaries which establish the conditions necessary for warning the pilot of a threat can be varied although it has been found that for present day aircraft a warning time of approximately 60 seconds is reasonable. The subject system may also use and cooperate with other components and systems employed in airplanes including the airplane's antenna system, the altitude system, the radar or Doppler system and others. The subject system can also be used to replace many systems and components without any loss of information.

Circuits for energizing the caution lights 55 and 57 are also shown in FIG. 2. If two or more aircrafts are at the same altitude and within a certain prescribed distance, the pilots should be cautioned of this situation, even if the intruding airplanes are not an immediate threat since any turning maneuver by one of the planes might cause the rate of closure to increase sharply and result in collision before a proper and timely warning can be given. To take care of this situation, the caution light 57 and its associated fixed range circuit is included. The circuit for this can be similar to the main warning circuits described above. This would include taking an additional fixed range voltage from the output of the potentiometer 92 and applying it as one input to a differential amplifier 120. The differential amplifier 120 can be identical in form and function to differential amplifier 82. The output of the range ramp 74 is applied as the other input to this differential amplifier 120 and a gate 122 similar to gate 96 and a multivibrator 124 similar to the multivibrator 98 are connected thereto. The multivibrator 124 produces an output warning whenever the measured range falls below a fixed predetermined range. This output would then be applied to "and" gate 126 which has other inputs representing the altitude of the receiving airplane. The "and" gate 126 produces outputs whenever another airplane flying at the same altitude is within the fixed cautionary range. Another multivibrator 128 may also be provided to keep the coaltitude caution light 57 turned on for a predetermined time period such as a second or two. If a coaltitude caution circuit is provided, the arbitrary selected warning range which is suggested as a mile and a half can be substantially reduced to around a quarter to a half mile. This is because one of the most important considerations for establishing the minimum warning range in the first place is the fact that sudden turns can cause a safe condition to rapidly become a dangerous condition before an adequate warning can be given. This is much less likely to occur, however, if the pilots know of the nearby presence of other planes flying at the same altitude. The circuit last described can be repeated for a number of fixed ranges so that coaltitude caution lights can be turned on at various ranges such for instance as at six miles, four miles, two miles, and one mile.

With the warning controls as previously described, it is also possible for airplanes to be within a dangerously close range and/or time to collision but not constitute a threat because of altitude separation. Under these conditions it is desirable to be able to caution the pilot in the receiving airplane. This can be accomplished by supplying an additional monostable multivibrator 130 connected to the output of the multivibrator 98 which is connected to the caution light 55. The multivibrator 130 is provided to keep the caution light on for a predetermined time such as one to two seconds. This warns the pilot in the receiving airplane to exercise caution in changing altitude since there is an airplane in the area which could become a threat. This warning can be further refined by comparing the altitude of the threatening airplane with the altitude of the receiving airplane to indicate whether the threatening airplane is above or below the receiving airplane. This can be done by gate circuits similar to those already described.

Figure 3:
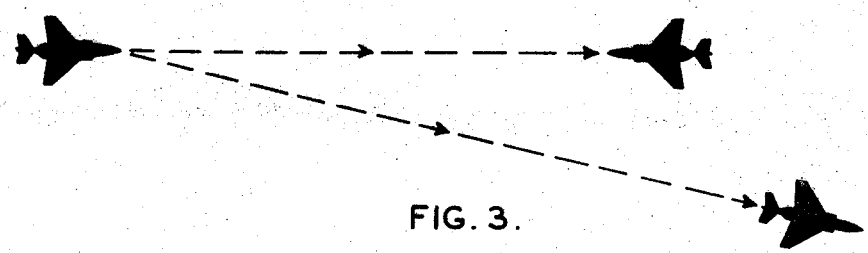
FIG. 3 is a diagrammatic view showing the relative in-flight positions of three airplanes.
Figure 4:
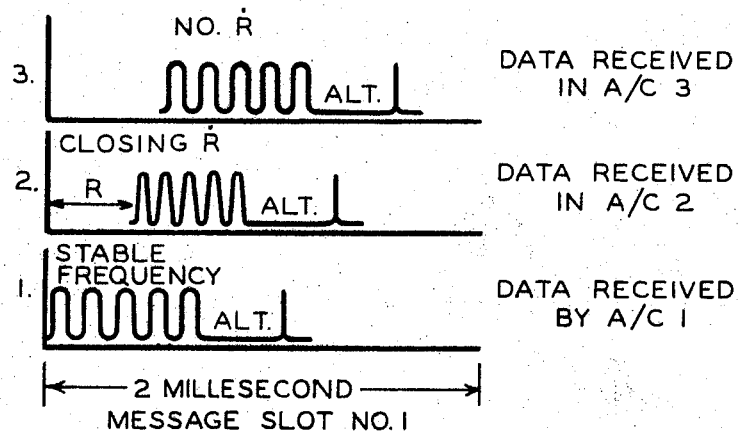
FIG. 4 is a graph of time ordered information transmitted and received between the airplanes shown in FIG. 3.

FIGS. 3 and 4 of the drawings show schematically what takes place between three airplanes flying relative to each other in the directions shown. In FIG. 3 two of the airplanes are shown traveling toward each other and two are shown traveling away from each other. FIG. 4 illustrates how these relative movements of the airplanes effect the range rate readings.

Figure 5:
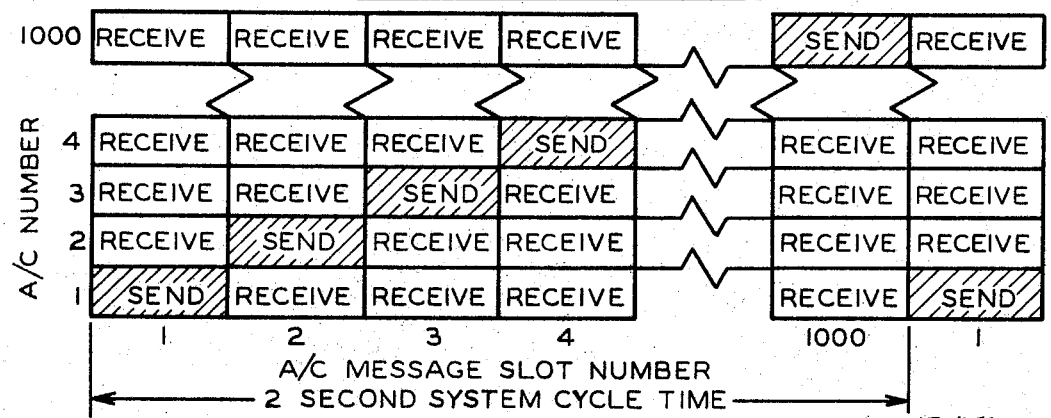
FIG. 5 is a chart illustrating the time ordered reporting schedule of a plurality of different cooperating airplanes.

FIG. 5 graphically illustrates a portion of a two second time period during which a complete cycle of operation takes place for the subject system. FIG. 5 also illustrates the repetitive nature of the time periods and the fact that each cooperating aircraft sends its message at a different assigned time.

FIG. 6 graphically illustrates some of the possible maneuvers that the pilot is instructed to make to avoid a potential collision. The condition of the cockpit display 46 for each of the illustrated threats is also indicated. The caution lights 55 and 57 are also shown.

The subject system as described herein has many important advantages over known systems, many of which are set forth above. Many of these advantages are obtained because all cooperating systems are accurately synchronized and are maintained in synchronism. Furthermore, the subject system relies only on information traveling in one direction between cooperating airplanes and therefore is faster acting than any known system and requires less equipment because it operates in real time. Furthermore, with the subject system frequent data transmissions take place between all cooperating airplanes and ground stations so that the information relied on is constantly being updated and is accurate and timely. The subject system is also able to accommodate each new airplane that enters the range and can eliminate airplanes that depart from its range and re-assign their message slots.

The subject system is fully compatible with other equipment normally carried by aircraft and may even duplicate information which already is being provided in the airplane. For this reason the subject system may even replace some of the equipment already installed. For example, the subject system can be used in place of known radio beacon and other similar equipment to transmit altitude data, and the subject system can be used to increase ground station information and accuracy. Many changes in the circuit employed can also be made.

Thus there has been shown and described a novel collision avoidance system and method which fulfills all of the objects and advantages sought therefor. Many changes, modifications, variations and other uses and applications of the subject system and method will, however, become apparent to those skilled in the art after considering this specification and the accompanying drawings. All such changes, modifications, alterations, and other uses and applications which do not depart from the spirit and scope of the invention are deemed to be covered by the invention which is limited only by the claims which follow.

What is claimed is:

1. Collision avoidance means for use on relatively movable objects comprising a plurality of objects each of which is provided with similar collision avoidance means, said collision avoidance means including transmitter and receiver means on each object, precision time keeping means on all cooperating objects including means for maintaining said time keeping means in accurate synchronism, means for establishing repeating time periods and for assigning a different transmission time in each period to each cooperating object, means on each object for producing a signal for transmission during every occurrence of its assigned transmission times including means for producing a first signal of a predetermined frequency and time duration, said first signals commencing at a precise time near the beginning of each occurrence of the associated transmission times, the duration of said first signals being long enough so that the receiving objects can accurately sense changes in the signal frequency due to relative movements between the sending and receiving objects, means for producing a second signal during each transmission time at a time after the first signal by a time interval proportional to the altitude of the transmitting object, means at each object for receiving said first and second signals from the transmitting objects, said receiving means including means for comparing the time receipt of each signal received from another object with a predetermined time in the same transmission time at the receiving object to determine by the difference therebetween the range between the sending and receiving objects, means at each receiving object for comparing the altitude coded into said second signals received with the altitude of the receiving object, means for determining the range rate including the direction and rate of relative movement between the transmitting and receiving objects, and means to give a visual warning of a potential collision threat between two or more of said objects whenever the range, range rate and altitude determinations at an object are within established limitations.

2. A collision avoidance system for aircraft and the like comprising means on each aircraft for transmitting and receiving signals to and from the other cooperating aircraft, means for assigning distinct times for each aircraft to transmit, means in each aircraft for producing a signal to be transmitted during every occurrence of its assigned transmission times, said last named means including means for coding the signals to be transmitted proportional to the altitude of the transmitting aircraft, means in each aircraft for receiving information transmitted by other aircraft within the range thereof, means responsive to the frequency of the received signals to determine the range rate between the sending and receiving aircraft, and means at each aircraft for determining from the received information whether any other aircraft represents a collision threat, said last named means including means for comparing the received altitude information with the altitude of the receiving aircraft, other means for determining from the time of receipt of each received signal the range between each transmitting and each receiving aircraft, and means for producing a visual warning at a receiving aircraft whenever the range, range rate and altitude of the transmitting aircraft as determined at the receiving aircraft are within predetermined established limits.

3. Collision avoidance means for use on aircraft and the like comprising time keeping means capable of generating an accurate stable output signal of predetermined frequency, transmitter means in each aircraft including means for energizing the transmitter means to transmit signals therefrom at predetermined times, said last named means including means establishing time intervals of predetermined duration and means for assigning different distinct times in said intervals for each cooperating aircraft to transmit, means at each aircraft for transmitting during every occurrence of its assigned times a range signal of predetermined time duration commencing at a precise time early in each occurrence of its assigned transmission time, said range signals being of long enough duration that changes in the frequency of said transmission due to relative movements between the transmitting and receiving aircraft can be sensed at the receiving aircraft, means responsive to the altitude of each aircraft for transmitting during its assigned transmitting time an altitude signal position coded in the transmitting times at a place that corresponds to the altitude thereat, receiving means in each cooperating aircraft including means for sensing the direction and magnitude of changes in the frequency of the range signals received due to relative movements between the transmitting and receiving aircraft, means for comparing the time of receipt of each range signal received from another aircraft with a predetermined time during the same transmission time at the receiving aircraft to determine the range to the transmitting aircraft from the time difference therebetween, other means for determining the altitude of the transmitting aircraft and for comparing the altitude with the altitude of the receiving aircraft, and means for producing a visual warning indication at the receiving aircraft whenever the range and altitude of the transmitting aircraft as determined at the receiving aircraft are within established limitations and the range rate indicates the transmitting and receiving aircraft are moving closer together.

4. The means for preventing collisions defined in claim 3 wherein said means for transmitting an altitude signal include means for modifying said altitude signals by extending them in a direction to take into account a climbing or diving maneuver of the aircraft.

5. Means to provide timely warnings of potential collision threats between two or more cooperating aircraft comprising means on each aircraft capable of keeping time accurately, means for synchronizing said time keeping means whereby said means in each cooperating aircraft keep time in simultaneously occurring time periods and at the same frequency, means for assigning a different distinct time interval in each time period to each cooperating aircraft as its transmission time so that each aircraft has its own distinct times for transmitting, means on each aircraft for transmitting during every occurrence of its assigned time interval signals which include a main pulse and a secondary pulse, the time of occurrence of said secondary pulses in said assigned time intervals being positioned coded to be proportional to the altitude of the aircraft at the time of transmission, means at each aircraft for determining from the time of receipt of each main pulse from another cooperating aircraft the range to said other cooperating aircraft, means for determining the relative velocity between cooperating transmitting and receiving aircraft from the frequency of the received signals, means in each aircraft for effectively dividing the range to each cooperating aircraft by the relative velocity between each cooperating aircraft and each receiving aircraft to produce a first threat evaluation output signal representing time to nearest approach, other means for comparing the altitude at each receiving aircraft with the altitudes encoded into the signals transmitted from other cooperating aircraft including means to produce a second threat evaluation output signal whenever a substantially coaltitude condition exists, and means responsive to the said first and second threat evaluation output signals for determining whether an actual threat exists, said last named means including means for indicating when a threat exists.

6. A collision avoidance system for aircraft and the like comprising means on each aircraft for transmitting and receiving signals to and from other cooperating aircraft, means on each aircraft capable of keeping time at the same frequency and in simultaneously occurring time periods, said time periods being subdivided into individual distinct message slots for assigning to each cooperating aircraft as its transmission times, means on each aircraft for energizing the transmitting means thereat to transmit a range pulse beginning at the beginning of each occurrence of its message slot, said range pulses having long enough durations so that aircraft receiving them can accurately determine the frequency thereof, other means on each aircraft for energizing the transmitting means thereat to transmit a position encoded altitude pulse during each occurrence of its message slot which pulses occur in each occurrence of the message slot at a position therein proportional to the altitude of the transmitting aircraft, means in each aircraft for decoding altitude pulses received from other aircraft and for comparing the decoded altitudes of said other aircraft with the altitude at the receiving aircraft, means for determining the range to all cooperating aircraft from the time of receipt of the range pulses, means for warning the pilot at each receiving aircraft whenever the altitude comparison and the range of any aircraft are within predetermined limitations, means for arbitrarily adjusting said limitations to change the conditions required to produce a warning, and panel indicator means under control of the altitude comparison and range determining means, said last named means including means for indicating what maneuver should be made to avoid a collision.

7. The collision avoidance system defined in claim 6 wherein said altitude pulse transmission means includes means for modifying the altitude pulses to take into account climbing and diving maneuvers.

8. The collision avoidance system defined in claim 6 including means for determining relative movement between cooperating aircraft.

9. The collision avoidance system defined in claim 6 including means for verifying that a signal received from a cooperating aircraft is a valid signal.

10. The collision avoidance system defined in claim 6 wherein said panel indicator means includes means indicating a climbing maneuver is needed, means indicating a diving maneuver is needed, and means indicating a level off maneuver is needed, and control circuit means connected between the panel indicator means and the range determining and altitude comparison means.

11. The collision avoidance system defined in claim 10 wherein means are provided to prevent the simultaneous energizing of the climb, dive and level off indicating means.

12. The collision avoidance system defined in claim 6 wherein said panel indicator means includes means to indicate situations requiring caution short of an actual threat, said last named means including means to indicate when another craft is flying nearby at the same altitude.

13. The collision avoidance system defined in claim 6 wherein said panel indicator means includes means to indicate a situation requiring caution short of an actual threat, said last named means including means to indicate that another craft if flying nearby but at a different altitude.

References Cited

UNITED STATES PATENTS

| | | | |
|---|---|---|---|
| 3,097,354 | 7/1963 | Blowney et al. | 343—6.5 |
| 3,114,146 | 12/1963 | Wiersma et al. | 343—6.5 |
| 3,167,772 | 1/1965 | Bagnall et al. | 343—6.5 X |

NEIL C. READ, *Primary Examiner.*

A. WARING, *Assistant Examiner.*

UNITED STATES PATENT OFFICE
CERTIFICATE OF CORRECTION

Patent No. 3,341,812                 September 12, 1967

Robert E. Perkinson et al.

It is hereby certified that error appears in the above numbered patent requiring correction and that the said Letters Patent should read as corrected below.

Column 6, line 75, after "of", second occurrence, insert -- the pulses from the counter 14 and the time of receipt of --; column 7, line 8, strike out "of", first occurrence.

Signed and sealed this 19th day of November 1968.

(SEAL)
Attest:

Edward M. Fletcher, Jr.                 EDWARD J. BRENNER
Attesting Officer                       Commissioner of Patents